(12) United States Patent
Sugimori et al.

(10) Patent No.: US 8,629,952 B2
(45) Date of Patent: Jan. 14, 2014

(54) MOBILE TERMINAL DEVICE

(75) Inventors: Kenta Sugimori, Kawasaki (JP);
Manabu Matsushima, Kawasaki (JP);
Yoshifumi Kajiwara, Kawasaki (JP);
Haruyoshi Yada, Kawasaki (JP);
Hiroshi Kubo, Kawasaki (JP); Hiroyuki Takita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 638 days.

(21) Appl. No.: 12/749,439

(22) Filed: Mar. 29, 2010

(65) Prior Publication Data

US 2010/0245709 A1    Sep. 30, 2010

(30) Foreign Application Priority Data

Mar. 30, 2009  (JP) .................................. 2009-83763

(51) Int. Cl.
*G02F 1/1333* (2006.01)
*G02F 1/1345* (2006.01)
*H04M 1/00* (2006.01)

(52) U.S. Cl.
USPC .......... 349/58; 349/149; 349/150; 361/679.3; 455/575.4

(58) Field of Classification Search
USPC ............ 349/58, 149, 150; 361/679.26, 679.3, 361/804; 455/575.1, 575.4
See application file for complete search history.

(56) References Cited

U.S. PATENT DOCUMENTS

| 5,739,887 | A * | 4/1998 | Ueda et al. ................... 349/149 |
| 6,636,281 | B1 * | 10/2003 | Kanatsu .......................... 349/58 |
| 2002/0180910 | A1 * | 12/2002 | Umemoto et al. ............ 349/113 |
| 2005/0243239 | A1 * | 11/2005 | Kondo et al. .................. 349/58 |
| 2008/0096619 | A1 | 4/2008 | Kuga |

FOREIGN PATENT DOCUMENTS

| JP | 2008-103989 | 5/2008 |
| JP | 2008-294653 A | 12/2008 |

OTHER PUBLICATIONS

Japanese Office Action mailed Sep. 4, 2012 for corresponding Japanese Application No. 2009-083763, with Partial English-language Translation.

* cited by examiner

*Primary Examiner* — Michael Caley
(74) *Attorney, Agent, or Firm* — Fujitsu Patent Center

(57) ABSTRACT

A mobile terminal device includes a liquid-crystal portion that displays an image; a substrate that sandwiches another component between one surface of the substrate and the liquid crystal portion, and that has another surface that is provided with a control circuit; a connecting portion that connects the liquid-crystal portion and the control circuit; and a spacer member formed of an insulator and interposed between the another surface of the substrate and the connecting portion.

4 Claims, 6 Drawing Sheets

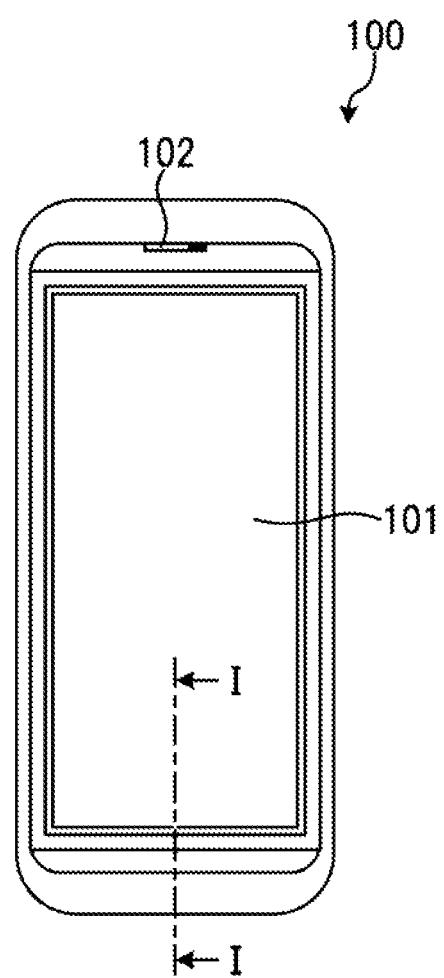

MOBILE TERMINAL DEVICE

CROSS-REFERENCE TO RELATED APPLICATIONS

This application is based upon and claims the benefit of priority of the prior Japanese Patent Application No. 2009-083763, filed on Mar. 30, 2009, the entire contents of which are incorporated herein by reference.

FIELD

The present invention relates to mobile terminal devices.

BACKGROUND

Since mobile terminal devices, such as mobile phones, have become more multifunctional in recent years, a single device is generally provided with many functions. For example, a mobile phone may be provided with a camera function and/or a function for receiving and displaying so-called "one-seg" television broadcast. Regarding such mobile terminal devices, the suitable shapes of mobile terminal devices vary depending on the respective functions. Specifically, a mobile terminal device is normally equipped with a control portion and a display portion, and a suitable positional relationship between the control portion and the display portion varies depending on the function.

For example, a sliding-type mobile phone has a housing that is mainly divided into two parts, i.e., a fixed side housing equipped with a control portion and a movable side housing equipped with a display portion. When not in use, the mobile phone is preferably set in its most compact shape in which the fixed side housing and the movable side housing lie over each other. When the mobile phone is to be used as a telephone, the entire device is preferably made as long as possible by sliding the movable side housing relative to the fixed side housing. When viewing and listening to one-segment broadcast, the display portion of the movable side housing is preferably set in a horizontal position for displaying a television image.

Since different device shapes are suitable for the respective functions of mobile terminal devices, such as mobile phones, the most recent mobile terminal devices are changeable into various shapes. In one example of a sliding-type mobile terminal device, not only is the movable side housing slidable relative to the fixed side housing, but the display portion of the movable side housing is also rotatable to a horizontal position after the movable side housing is slid relative to the fixed side housing. If a user desires to make a telephone call using such a sliding-type mobile phone, the user may slide the movable side housing relative to the fixed side housing, and if the user desires to view and listen to a one-segment broadcast, the user may subsequently rotate the movable side housing. Thus, when making a telephone call, the mobile phone is set in a vertical position so as to allow for enhanced usability, and when viewing and listening to one-segment broadcast, the display portion of the mobile phone is set in a horizontal position so that a television image can be displayed by maximally utilizing the screen size of the display portion. When viewing and listening to a one-segment broadcast, only the display portion is set in the horizontal position and the fixed side housing equipped with the control portion remains in the vertical position so that the control portion of the fixed side housing can be readily operated.

[Patent Document 1] Japanese Laid-Open Patent Publication No. 2008-103989

In order to enhance operability in the aforementioned mobile terminal device, the display portion and the control portion are often integrated by using, for example, a liquid-crystal panel and a touch-screen. With such a mobile terminal device, the user can operate the mobile terminal device by actually touching the display portion while viewing an image displayed on the display portion, thereby achieving more sensitive and user-friendly operability. The touch-screen is adhered to the underside of a design panel provided on a surface of the mobile terminal device and detects contact on the design panel. Instead of directly touching the touch-screen, the user applies pressure to the touch-screen by touching the design panel.

However, when the number of times the user touches the display portion increases, external pressure applied to the display portion can sometimes cause glass or the like to break inside the device. Specifically, the user who operates the mobile terminal device presses, for example, an icon or the like displayed on the display portion, but since the display portion is provided with breakable components, such as glass which is a transparent material, there is a high possibility that these components may break depending on the pressing force.

In a mobile terminal device, such as a sliding-type mobile phone, in which the display portion is exposed on the surface thereof even when not in use, there is a possibility that the display portion may receive external pressure even when the device is not in use. Therefore, protecting the components against breakage due to external pressure is important. Even in a mobile terminal device, such as a folding-type mobile phone, in which the display portion is not exposed on the surface thereof when the device is not in use, if the device is equipped with a touch-screen, there is still a possibility that the components may break since the user can touch the display portion when the user uses the device.

Although there is a conceivable measure of disposing an additional reinforcement component around the breakable components, this measure is not very desirable as it may conceivably lead to an increase in the number of components and to an increase in the size of the device.

SUMMARY

According to an aspect of the invention, a mobile terminal device includes a liquid-crystal portion that displays an image; a substrate that sandwiches another component between one surface of the substrate and the liquid crystal portion, and that has another surface that is provided with a control circuit; a connecting portion that connects the liquid-crystal portion and the control circuit; and a spacer member formed of an insulator and interposed between the another surface of the substrate and the connecting portion.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF THE DRAWINGS

FIG. 2A is a plan view of the mobile terminal device according to the embodiment illustrated in a first state;

DESCRIPTION OF EMBODIMENTS

An embodiment of a mobile terminal device disclosed herein will be described below with reference to the drawings. The following description is directed to a mobile phone as an example of the mobile terminal device. The present invention is not to be limited by this embodiment.

Figure 1:
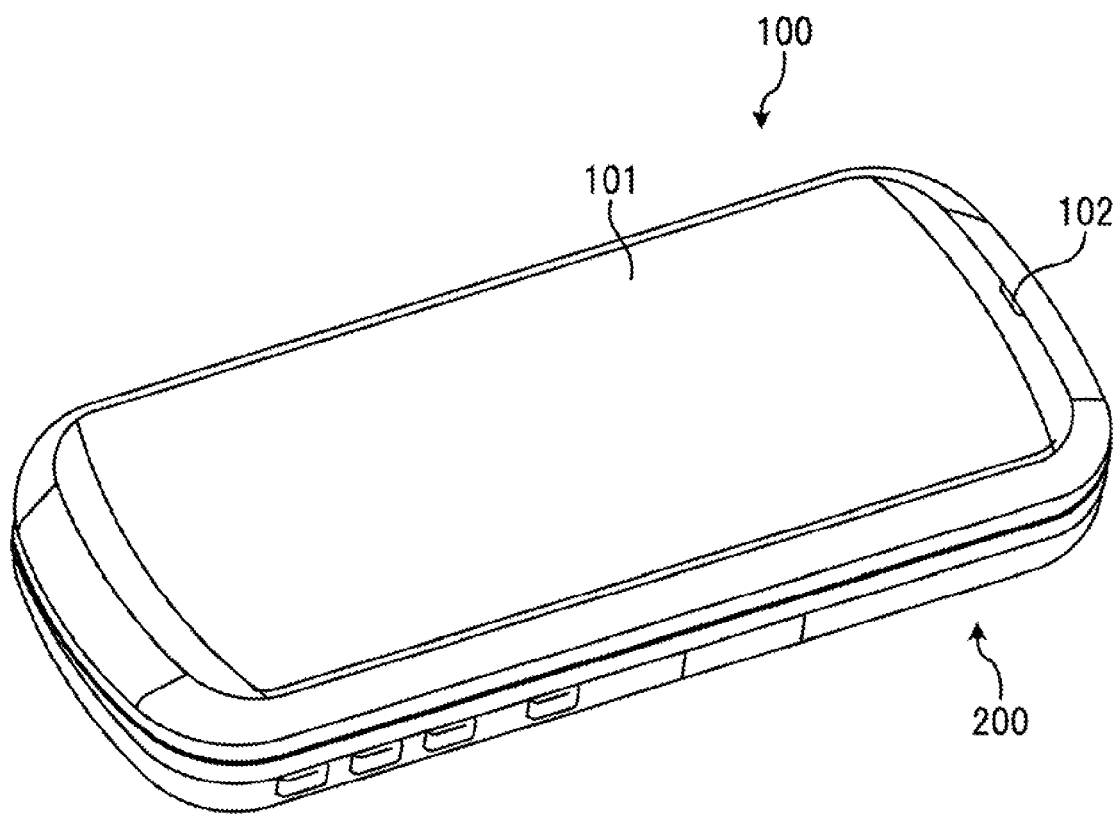
FIG. 1 is an external perspective view of a mobile terminal device according to an embodiment.

FIG. 1 is an external perspective view of the mobile terminal device according to an embodiment. The mobile terminal device is a sliding-type mobile phone having a movable side housing 100 and a fixed side housing 200.

The movable side housing 100 is slidably attached to the fixed side housing 200 and overlies the fixed side housing 200 when the mobile terminal device is not in use, and is slid relative to the fixed side housing 200 in the longitudinal direction when a key provided on the fixed side housing 200 is operated. The movable side housing 100 includes a liquid-crystal panel 101 and a receiver hole 102 on a surface thereof.

The liquid-crystal panel 101 is a panel that covers the surface of the movable side housing 100 and displays various images on a display portion provided in or near the middle thereof. A touch-screen (not illustrated) is adhered to the undersurface of the liquid-crystal panel 101. The touch-screen detects contact on the liquid-crystal panel 101 and also functions as a control portion.

The receiver hole 102 is a hole provided near a receiver located inside the mobile terminal device and guides telephone audio output from the receiver to the outside of the mobile terminal device. Therefore, when a user makes a telephone call, the user brings his/her ear substantially into contact with the receiver hole 102.

The fixed side housing 200 is in contact with a surface of the movable side housing 100 opposite the surface of the movable side housing 100 provided with the liquid-crystal panel 101. Although the fixed side housing 200 has a control key portion including, for example, keys 0 to 9 (not illustrated), the control key portion is stored between the fixed side housing 200 and the movable side housing 100 when the mobile terminal device is not in use.

FIG. 2A is a plan view of the mobile terminal device according to the embodiment illustrated in a first state. When the mobile terminal device is not in use, the movable side housing 100 and the fixed side housing 200 lie over each other. Unlike the liquid-crystal panel 101 that is exposed on the surface of the movable side housing 100, the control key portion of the fixed side housing 200 is in a stored state. Therefore, when the device is not in use, the control key portion of the fixed side housing 200 may not be operated by mistake, thereby reducing if not preventing the occurrence of mis-operation. When the mobile terminal device is in the state illustrated in FIG. 2A, the state does not necessarily indicate that the mobile terminal device is not being used. Even if the movable side housing 100 and the fixed side housing 200 lie over each other and the control key portion of the fixed side housing 200 is in a stored state, the mobile terminal device is capable of performing various processing.

Specifically, as will be described later using a cross-sectional view of the movable side housing 100 taken along line I-I, since the touch-screen is adhered to the undersurface of the liquid-crystal panel 101, the mobile terminal device may still be operated by touching the liquid-crystal panel 101 even when the control key portion is in a stored state. For example, a telephone call may be made or ended by pressing an icon or the like displayed on the liquid-crystal panel 101. In addition, if the fixed side housing 200 may be equipped with, for example, a camera lens, an image taken by the lens may be displayed on the liquid-crystal panel 101, and the display magnification and the display position of the image may be adjusted by touching the liquid-crystal panel 101.

Figure 2B:
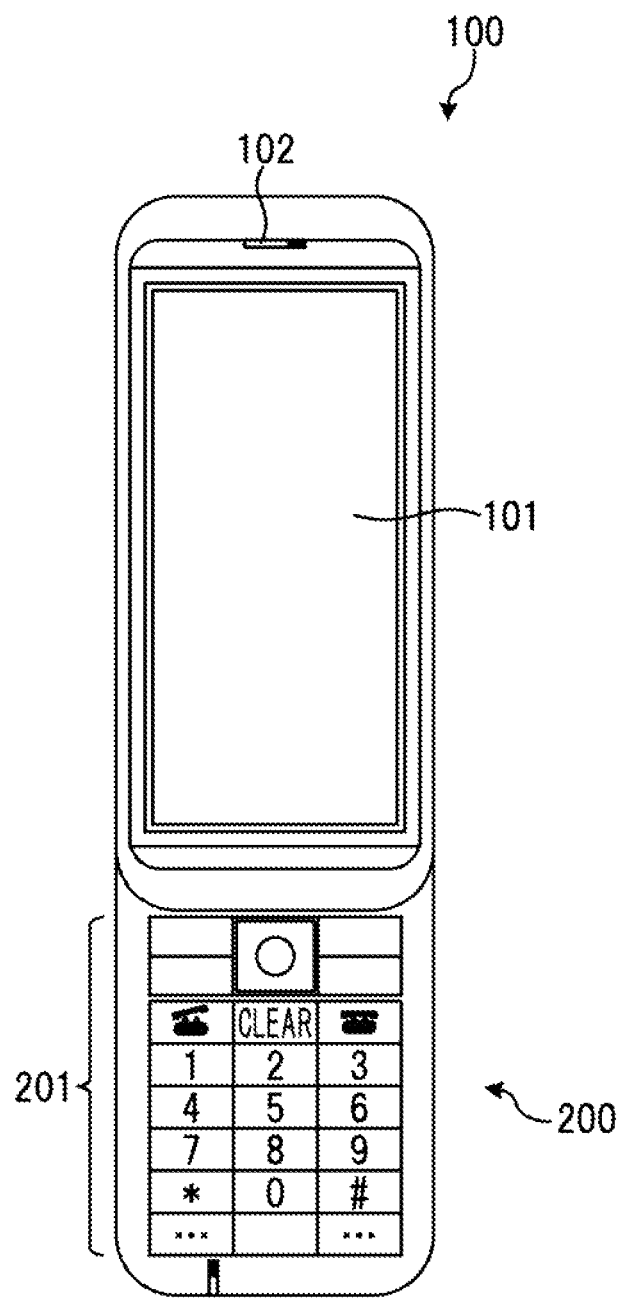
FIG. 2B is a plan view of the mobile terminal device according to the embodiment illustrated in a second state.
Figure 3:
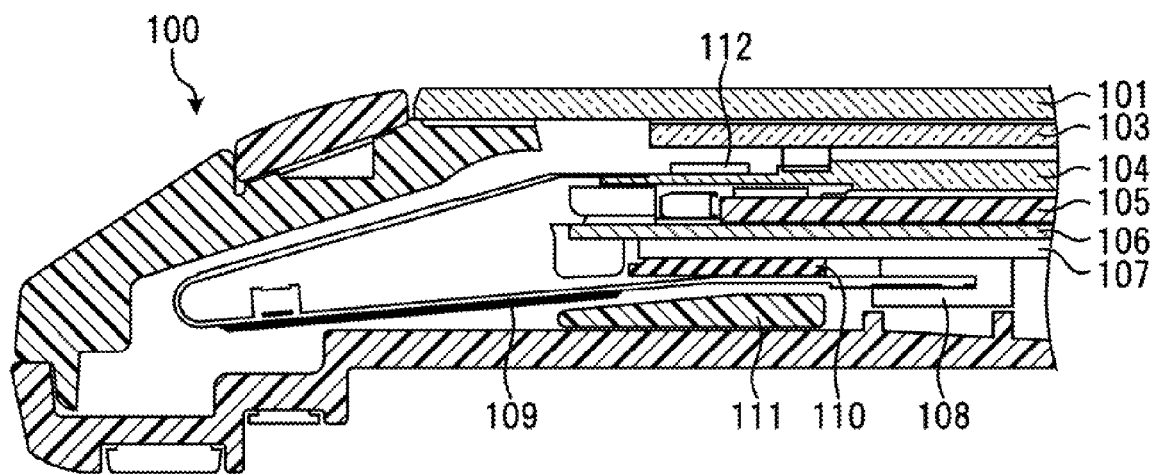
FIG. 3 is a cross-sectional view illustrating the configuration of a movable side housing according to the embodiment.

On the other hand, when inputting, for example, a telephone number, keys in a control key portion provided in the fixed side housing 200 are operated. In this case, the movable side housing 100 is slid relative to the fixed side housing 200 so that, for example, a control key portion 201 of the fixed side housing 200 is exposed on a surface thereof, as illustrated in FIG. 2B. With regard to the sliding operation of the movable side housing 100, the movable side housing 100 may be configured to be manually slidable by the user, or the movable side housing 100 may be configured to be slidable in response to, for example, pressing of a button disposed on a side surface of the fixed side housing 200.

In the state illustrated in FIG. 2B, the control key portion 201 is available for key operation, and the liquid-crystal panel 101 mainly functions as a display portion. The mobile terminal device may be configured to be operable by touching the liquid-crystal panel 101 even in the state illustrated in FIG. 2B. For example, when viewing and listening to one-segment broadcast, the movable side housing 100 may be rotated so that the liquid-crystal panel 101 that is vertical (i.e., substantially parallel to the longitudinal axis of the mobile terminal device) in the state illustrated in FIG. 2B is changed to a horizontal position (i.e., substantially perpendicular to the longitudinal axis of the mobile terminal device).

The internal configuration of the movable side housing 100 will now be described The movable side housing 100 has the liquid-crystal panel 101 attached to the surface thereof, and accommodates therein a touch-screen 103, a liquid-crystal module 104, a light guide plate 105, a metal plate 106, a substrate 107, a connector 108, a flexible cable 109, a spacer 110, a spacer 111, and a driver 112.

The touch-screen 103 is adhered to the undersurface of the design panel 101 and detects contact on the liquid-crystal panel 101. The touch-screen 103 notifies, for example, a control circuit (not illustrated), provided in a substrate 107 inside the movable side housing 100, of the detected contact position.

The liquid-crystal module 104 may be composed of a breakable transparent material, such as glass, and outputs an image to be displayed on the liquid-crystal panel 101. The liquid-crystal module 104 is connected, via the liquid-crystal flexible cable 109, to a control circuit (not illustrated) provided on the substrate 107 and outputs an image transmitted from the control circuit via the liquid-crystal flexible cable 109. A connection area between the liquid-crystal module 104 and the liquid-crystal flexible cable 109 is thinner than other areas and is therefore breakable. The connection area between the liquid-crystal module 104 and the liquid-crystal flexible cable 109 may be formed of, for example, a single sheet of glass, whereas the other areas may be formed of two sheets of glass that are adhered to each other.

The light guide plate 105 emits light using light supplied from a light emitting diode (LED) (not illustrated) provided on an edge thereof and serves as a light source for an output image output from the liquid-crystal module 104. The metal plate 106 is fixed to the movable side housing 100 and has an attachment section to which other components, such as the substrate 107, are attached. The substrate 107 includes the control circuit (not illustrated) and outputs an image to the liquid-crystal module 104 and performs appropriate processing in accordance with a contact position on the touch-screen 103.

The connector 108 is provided at an end of the liquid-crystal flexible cable 109 and is attached to the control circuit (not illustrated) of the substrate 107. The connector 108 connects the liquid-crystal flexible cable 109 to the substrate 107.

The liquid-crystal flexible cable 109 is a flexible cable composed of a flexible material and connects the control circuit (not illustrated) of the substrate 107 to the liquid-crystal module 104. In order to connect the liquid-crystal module 104 and the substrate 107, which sandwich other components such as the light guide plate 105 and the metal plate 106, without any gaps, the liquid-crystal flexible cable 109 is folded in a curved shape at the midsection thereof so as to connect surfaces, facing away from each other, of the liquid-crystal module 104 and the substrate 107. The liquid-crystal flexible cable 109 transmits the output image from, for example, the control circuit to the liquid-crystal module 104.

The spacer 110 is formed of an insulator and is a component having a thickness substantially equal to the distance from the surface of the substrate 107 to the liquid-crystal flexible cable 109 when connected to the substrate 107 via the connector 108. The spacer 110 is disposed below the connection area between the liquid-crystal module 104 and the liquid-crystal flexible cable 109 and is inserted in a gap between the substrate 107 and the liquid-crystal flexible cable 109. The spacer 110 forms a single layer in a region that overlaps a thin breakable area of the liquid-crystal module 104. The spacer 110 reduces if not prevents the liquid-crystal flexible cable 109 from coming into contact with the substrate 107 and also reduces if not prevents a space from being formed between the substrate 107 and the liquid-crystal flexible cable 109.

The spacer 111 is fixed to the movable side housing 100 and is provided at a position where the spacer 111 sandwiches the liquid-crystal flexible cable 109 together with the spacer 110. Similar to the spacer 110, the spacer 111 forms a single layer in a region that overlaps the thin breakable area of the liquid-crystal module 104. The spacer 111 reduces if not prevents a space from being formed between the liquid-crystal flexible cable 109 and an inner surface of the movable side housing 100.

With the spacer 110 interposed between the substrate 107 and the liquid-crystal flexible cable 109 and the spacer 111 disposed facing the spacer 110, a movable range of the liquid-crystal flexible cable 109 when the liquid-crystal panel 101 is pressed is narrowed. Since the liquid-crystal flexible cable 109 has hardly any movable range, the liquid-crystal module 104, bending of the light guide plate 105, the metal plate 106, and the substrate 107 is reduced if not prevented even when the liquid-crystal panel 101 is pressed, whereby breaking of the liquid-crystal module 104 may be reduced if not prevented.

The driver 112 is provided near the connection area between the liquid-crystal module 104 and the liquid-crystal flexible cable 109 and is configured to drive the liquid-crystal module 104. The driver 112 causes the liquid-crystal module 104 to output an image transmitted by the liquid-crystal flexible cable 109.

In this embodiment, the liquid-crystal module 104 is composed of a breakable material, such as glass, and if the liquid-crystal module 104 bends due to pressing on the liquid-crystal panel 101, the thin connection area between the liquid-crystal module 104 and the liquid-crystal flexible cable 109 may break. In this embodiment, the spacer 110 for insulating the liquid-crystal flexible cable 109 is interposed between the substrate 107 and the liquid-crystal flexible cable 109 so that no layer of empty space is formed between the substrate 107 and the liquid-crystal flexible cable 109 below the thin area of the liquid-crystal module 104.

In this embodiment, the spacer 111 is provided below the spacer 110 and the liquid-crystal flexible cable 109 so that no layer of empty space is formed between the liquid-crystal flexible cable 109 and the inner surface of the movable side housing 100. In the thin-area range of the liquid-crystal module 104, no layer of space is formed in any of areas between the liquid-crystal panel 101 and the inner surface of the movable side housing 100, thereby reducing if not preventing the thin area of the liquid-crystal module 104 from bending.

In consequence, even when the liquid-crystal panel 101 is pressed and receives pressure, the bending of the connection area between the liquid-crystal module 104 and the liquid-crystal flexible cable 109 may be reduced if not prevented, thereby lowering the possibility of breakage in this area. Since the substrate 107 and the liquid-crystal flexible cable 109 are insulated from each other by the spacer 110 and may not come directly into contact with each other, occurrence of a malfunction that may be caused when electric current flowing through, for example, the control circuit (not illustrated) of the substrate 107 also flows through the liquid-crystal flexible cable 109 may be reduced if not prevented.

Since the spacer 110 is additionally provided for reducing or preventing the liquid-crystal module 104 from breaking and as an insulator between the substrate 107 and the liquid-crystal flexible cable 109, an increase in the number of components as a result of providing the spacer 110 is minimized.

Since the spacer 110 has a thickness substantially equal to the distance from the surface of the substrate 107 to the liquid-crystal flexible cable 109 when connected to the substrate 107 via the connector 108, the spacer 110 supports the liquid-crystal flexible cable 109 at an appropriate position when attaching the connector 108 to the substrate 107. This may facilitate the attachment process of the connector 108 and make the assembly process of the mobile terminal device more efficient.

According to this embodiment, the aforementioned other components are sandwiched between the liquid-crystal module and the substrate without any gaps, the liquid-crystal module and the substrate are connected to each other via the liquid-crystal flexible cable, and a spacer formed of an insulator is set between the substrate and the liquid-crystal flexible cable. Thus, layers of empty spaces are not formed, and bending of the liquid-crystal module is reduced if not prevented even when the liquid-crystal module receives pressure due to pressing on the liquid-crystal panel. In consequence, the breaking of the liquid-crystal module may be reduced if not prevented. Since the spacer is a component required also for insulation for the liquid-crystal flexible cable, an additional dedicated component for preventing the liquid-crystal module from breaking does not need to be provided, and an increase in the number of components may thus be minimized.

Although a sliding-type mobile phone is described as an example of a mobile terminal device in the above embodiment, a configuration similar to that of the above embodiment may be applied to, for example, a folding-type mobile phone or a straight-type mobile phone.

Figure 4:
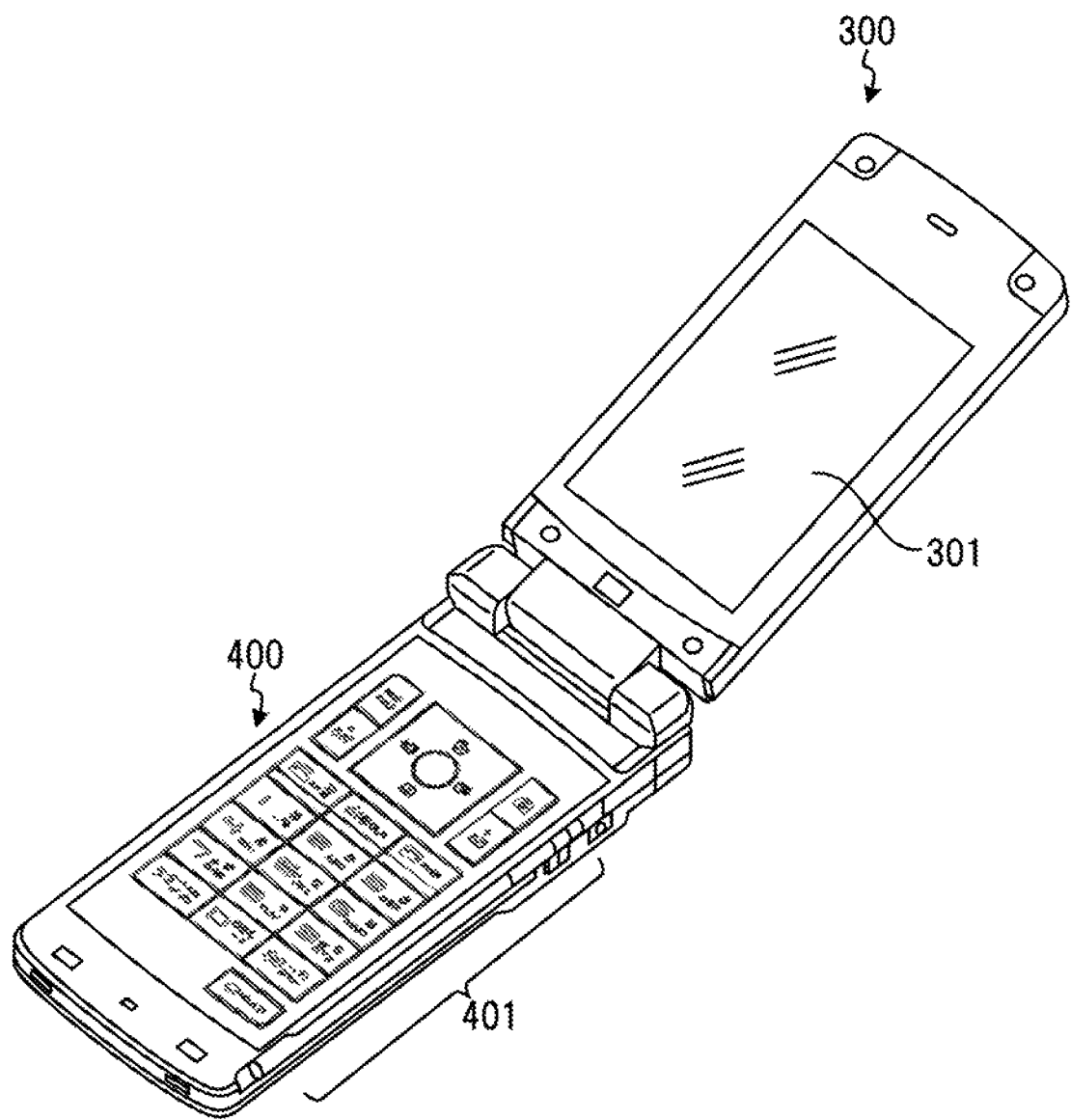
FIG. 4 is an external view of a mobile terminal device according to another embodiment.

Specifically, for example, the folding-type mobile phone illustrated in FIG. 4 includes a movable side housing 300 equipped with a design panel 301, and a fixed side housing 400 equipped with a control key portion 401. When the folding-type mobile phone is in a folded state, the movable side housing 300 and the fixed side housing 400 lie over each other so that the design panel 301 and the control key portion 401 are in a stored state. However, since the liquid-crystal panel 301 and the control key portion 401 are in an exposed state when the folding-type mobile phone is in use, the liquid-crystal module inside the movable side housing 300 sometimes receives pressure if the mobile phone is configured to be operable by touching the liquid-crystal panel 301.

As mentioned above, the aforementioned other components are sandwiched between the liquid-crystal module inside the movable side housing 300 and the substrate without any gaps, the liquid-crystal module and the substrate are connected to each other via the liquid-crystal flexible cable, and a spacer formed of an insulator is set between the substrate and the liquid-crystal flexible cable. In consequence, bending of the liquid-crystal module is reduced if not prevented even when the liquid-crystal module receives pressure due to pressing on the liquid-crystal panel 301, thereby reducing if not preventing the liquid-crystal module from breaking.

Figure 5:
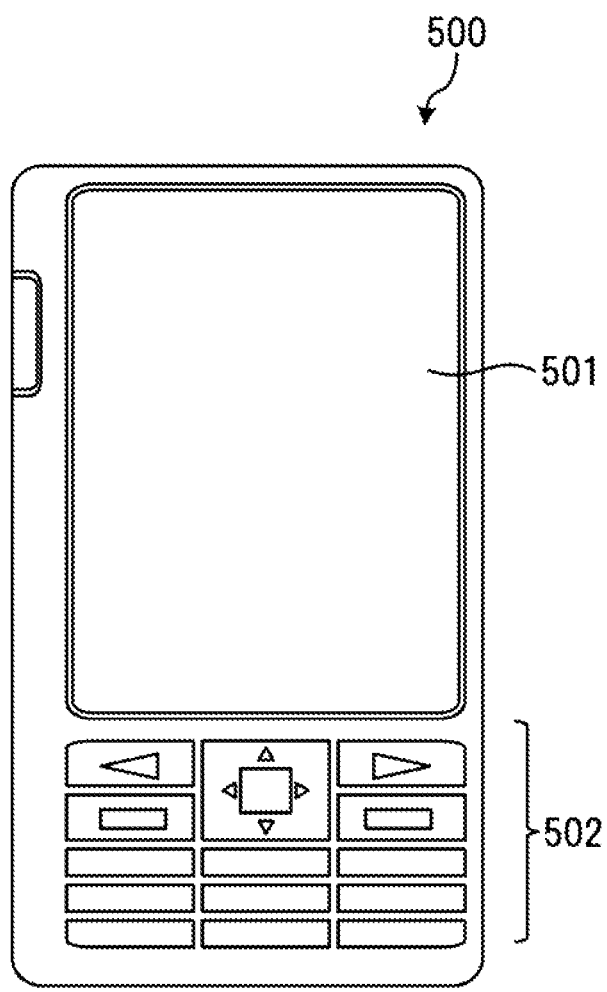
FIG. 5 is an external view of a mobile terminal device according to yet another embodiment.

FIG. 5 illustrates an example of a straight-type mobile phone that has a single housing 500 provided with a design panel 501 and a control key portion 502. Therefore, since the liquid-crystal panel 501 is always in an exposed state regardless of whether the straight-type mobile phone is in use or not in use, the liquid-crystal module inside the housing 500 sometimes receives pressure.

As mentioned above, the aforementioned other components are sandwiched between the liquid-crystal module inside the movable side housing 500 and the substrate without any gaps, the liquid-crystal module and the substrate are connected to each other via the liquid-crystal flexible cable, and a spacer formed of an insulator is set between the substrate and the liquid-crystal flexible cable. In consequence, bending of the liquid-crystal module is reduced if not prevented even when the liquid-crystal module receives pressure due to pressing on the liquid-crystal panel 501, thereby reducing if not preventing the liquid-crystal module from breaking.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions has been described in detail, it should be understood that the various changes, substitutions, and alterations could be made hereto without departing from the spirit and scope of the invention.

What is claimed is:

1. A mobile terminal device comprising:
   a liquid-crystal portion that displays an image;
   a substrate that sandwiches another component between one surface of the substrate and the liquid crystal portion, and that has another surface that is provided with a control circuit;
   a connecting portion that connects the liquid-crystal portion and the control circuit;
   a spacer member formed of an insulator and interposed between the another surface of the substrate and the connecting portion; and
   an auxiliary member that is disposed at a position where the auxiliary member and the spacer member sandwich a part of the connecting portion therebetween and is configured to narrow a movable range of the part of the connecting portion when the liquid crystal portion is pressed.

2. The mobile terminal device according to claim 1, wherein the connecting portion includes a cable having flexibility and a connector that connects the cable to the control circuit, and
   wherein the spacer member has a thickness substantially equal to a distance between the another surface and the cable when the cable is connected to the control circuit via the connector, and is interposed between the another surface and the cable.

3. The mobile terminal device according to claim 1, wherein the liquid-crystal portion further comprises:
   a liquid-crystal module that is connected to the control circuit via the connecting portion and that outputs an image;
   a liquid-crystal panel that displays the image output from the liquid-crystal module; and
   a touch-screen that is adhered to the liquid-crystal panel and that detects contact on the liquid-crystal panel.

4. The mobile terminal device according to claim 3, wherein the liquid-crystal module has a first area that outputs the image, and a second area that is formed thinner than the first area, and
   wherein the spacer member is interposed between the another surface of the substrate and the connecting portion at a position corresponding to the second area.

* * * * *